(12) United States Patent
Boutaghou et al.

(10) Patent No.: US 6,639,761 B1
(45) Date of Patent: Oct. 28, 2003

(54) MICRO-ACTUATOR DAMPING AND HUMIDITY PROTECTION

(75) Inventors: Zine Eddine Boutaghou, Vadnais Heights, MN (US); Peter R. Segar, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/589,325

(22) Filed: Jun. 7, 2000

Related U.S. Application Data
(60) Provisional application No. 60/168,852, filed on Dec. 2, 1999.

(51) Int. Cl.[7] .................................................. G11B 5/48
(52) U.S. Cl. ............................................... 360/294.1
(58) Field of Search ........................... 360/294.1, 294.3, 360/291.9, 294.4, 294.5; 310/309, 311, 321

(56) References Cited

U.S. PATENT DOCUMENTS

| | | | | |
|---|---|---|---|---|
| 3,946,167 A | | 3/1976 | Schultz | 179/100.41 P |
| 4,139,793 A | * | 2/1979 | Michel | 310/353 |
| 4,196,631 A | * | 4/1980 | Deom et al. | 73/644 |
| 5,025,346 A | * | 6/1991 | Tang et al. | 361/283.1 |
| 5,457,352 A | | 10/1995 | Muller et al. | 310/327 |
| 5,600,065 A | * | 2/1997 | Kar et al. | 73/504.12 |
| 5,745,319 A | | 4/1998 | Takkekado et al. | 360/78.05 |
| 5,750,272 A | * | 5/1998 | Jardine | 428/686 |
| 5,764,441 A | | 6/1998 | Aruga et al. | 360/106 |
| 5,764,444 A | | 6/1998 | Imamura et al. | 360/109 |
| 5,834,864 A | | 11/1998 | Hesterman et al. | 310/40 MM |
| 5,844,348 A | | 12/1998 | Gamo | 310/340 |
| 5,959,808 A | | 9/1999 | Fan et al. | 360/106 |
| 6,222,706 B1 | * | 4/2001 | Stefansky et al. | 360/294.5 |
| 6,250,158 B1 | | 6/2001 | Stewart | 73/504.14 |
| 6,359,757 B1 | * | 3/2002 | Mallary | 360/294.3 |

* cited by examiner

Primary Examiner—George J. Letscher

(57) ABSTRACT

A micro-actuator including a skeleton having flexible beams, a rotor portion, a stator portion, and a damping material. The flexible beams connect the rotor portion to the stator portion and the damping material is applied to the skeleton. The damping material provides a protective layer to the flexible beams of a micro-actuator. The damping material increases the damping characteristics of the micro actuator and limits the penetration of humidity into the skeleton of the micro actuator.

23 Claims, 7 Drawing Sheets

MICRO-ACTUATOR DAMPING AND HUMIDITY PROTECTION

RELATED APPLICATION

This application claims the benefit of U.S. Provisional Application Serial No. 60/168,852, filed Dec. 2, 1999 under 35 U.S.C. 119(e).

FIELD OF THE INVENTION

The present invention relates to the field of mass storage devices. More particularly, this invention relates to micro-actuator damping and humidity protection in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

Some disc drives include micro-actuators. The micro-actuator is an additional actuator located on the load spring to provide minor positioning adjustments to the transducer. Micro-actuators have a first order mass spring mode below 2 kHz which can be compensated for by the servo system. However, any mechanical excitation that occurs at a frequency close to the first order mass spring mode frequency presents challenges in retargeting the micro-actuator. In addition, other factors including shock performance and power consumption affect the design of the beam geometry.

In addition, micro-actuators comprising silicon structures subjected to humid conditions are susceptible to crack initiations at stress concentration areas.

What is needed is a disc drive that has a reduced amplitude of the mass spring mode of the micro-actuator as well as protection against humid conditions.

SUMMARY OF THE INVENTION

One embodiment provides a micro-actuator including a skeleton having flexible beams, a rotor portion, a stator portion, and a damping material. The flexible beams connect the rotor portion to the stator portion and the damping material is applied to the skeleton.

The damping material provides a protective layer to the flexible beams of a micro-actuator. The damping material increases the damping characteristics of the micro actuator and limits the penetration of humidity into the skeleton of the micro actuator.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
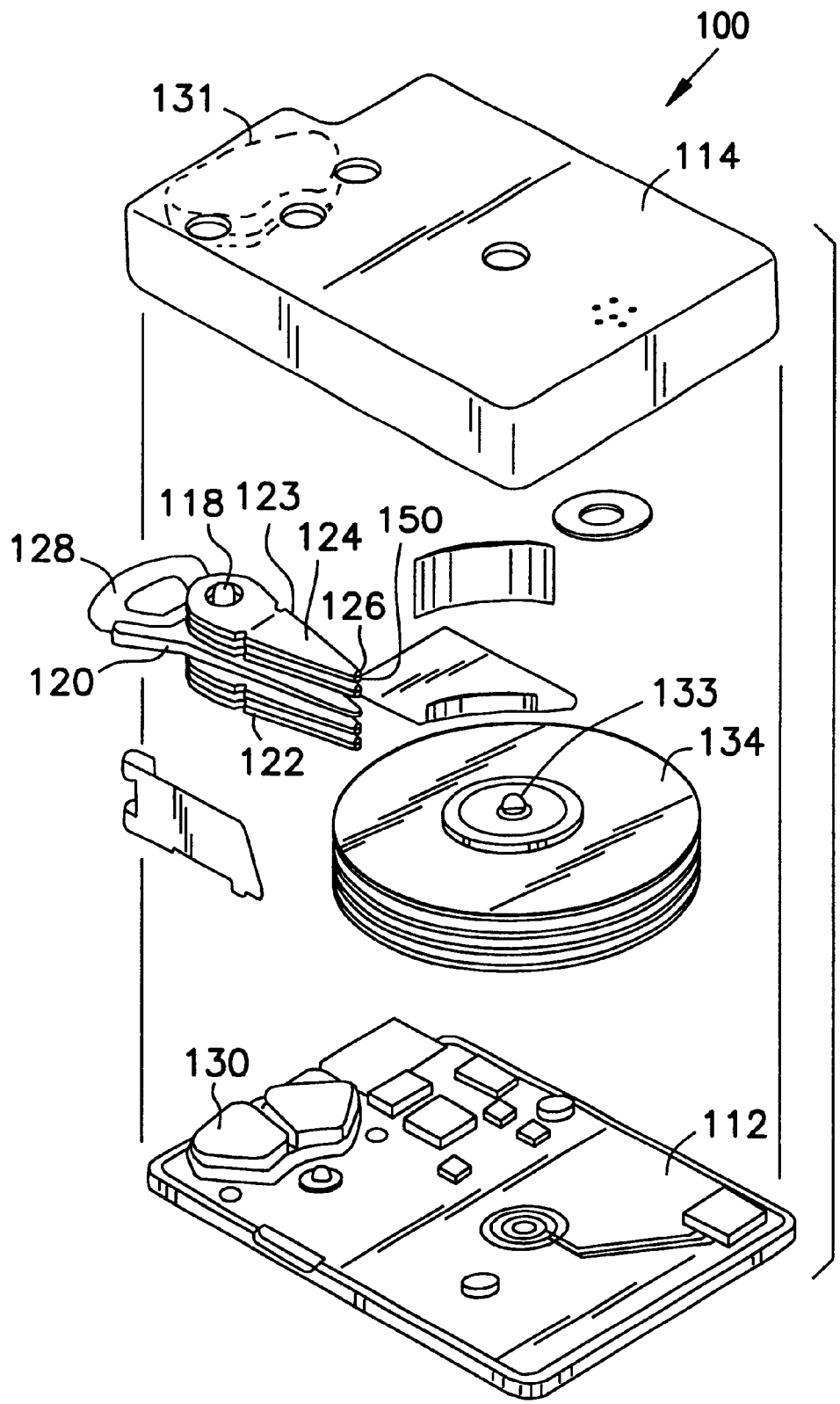
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the-end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
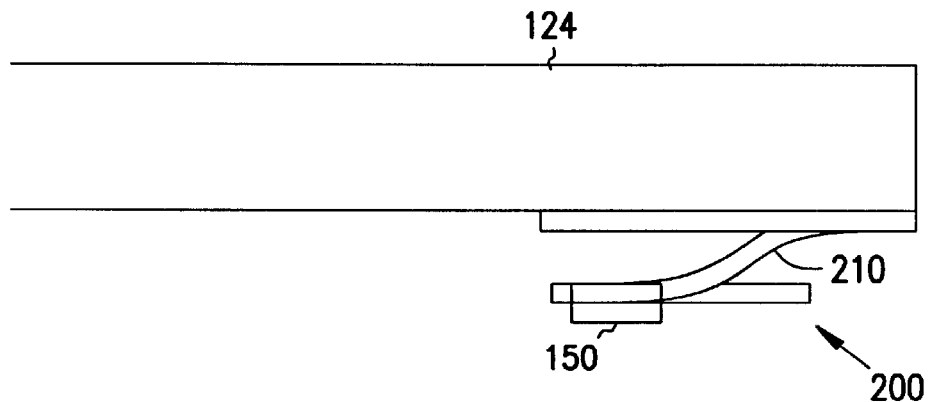
FIG. 2 is a perspective view-of one embodiment of a micro-actuator attached to a spring beam.

As shown in FIG. 2, a skeleton 200 attaches transducer 150 to load spring 124. A slider attaches to the gimbal assembly. The slider comprises the transducer.

Figure 3:
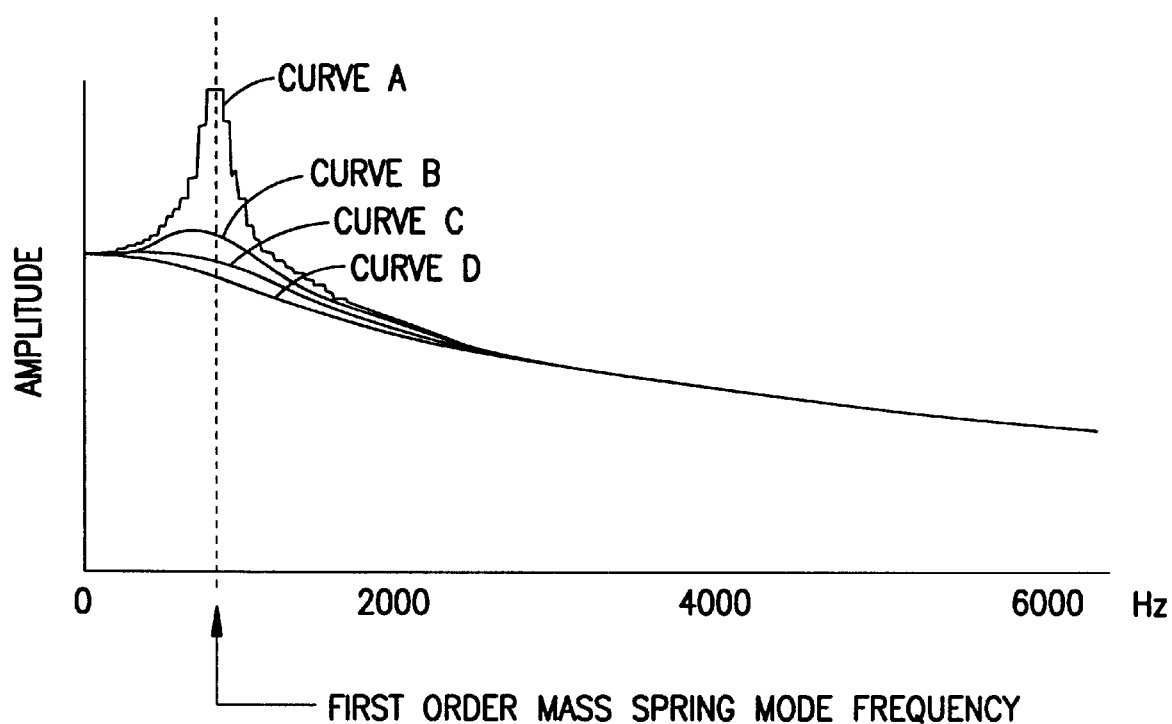
FIG. 3 is a graph showing mass spring amplitude versus mass spring frequency of various embodiments of micro actuators.

As shown in FIG. 3, micro-actuator designs have a first order mass spring mode frequency below 2kHz. Typically, vibration at a mass spring mode frequency can be compensated for by the servo system. Curve A of FIG. 3 shows a typical response of present design lightly damped microactuator systems. Curves B–D indicate the response of damped systems.

Mechanical excitation occurring close to the mass-spring first mode frequency can cause problems of retargeting the micro-actuator. Increased amplitude at the mass-spring first mode frequency caused by mechanical excitation makes fine control of the micro-actuator difficult.

The design of the beam geometry is not only dictated by the frequency of the mass spring-system, but also by the shock performance and power consumption of the system. Reducing the amplitude of the mass spring mode improves the speed of implementation of head level micro-actuators.

Figure 4:
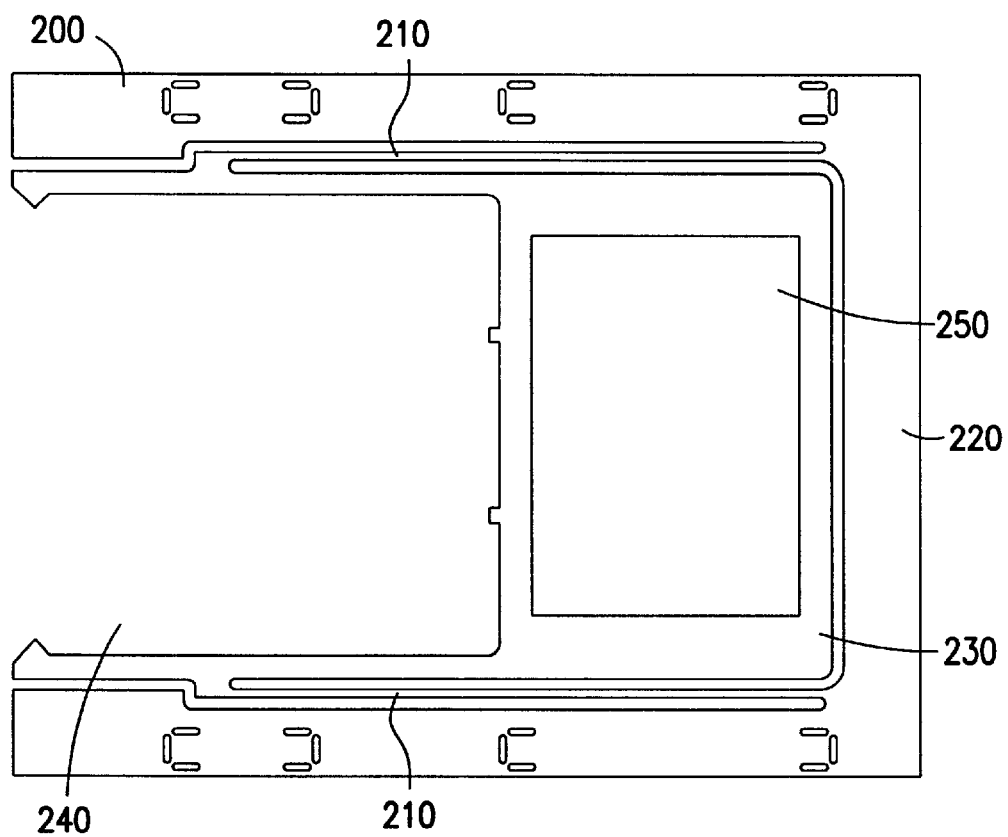
FIG. 4 is a top view of one embodiment of a skeleton of a micro actuator.

As shown in FIG. 4 one embodiment of the present invention reduces the primary or first order mass spring mode amplitude as well as other higher frequency modes.

Figure 5:
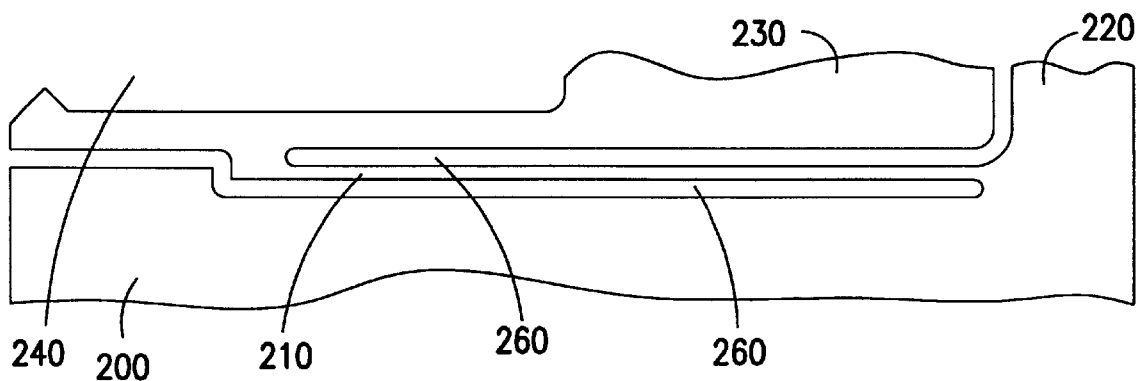
FIG. 5 is a enlarged partial top view of one embodiment of a skeleton of a micro actuator.
Figure 6:
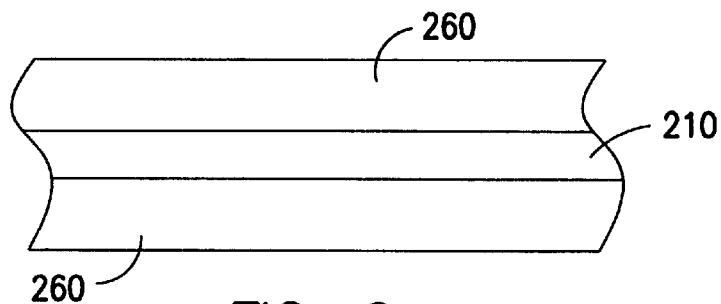
FIG. 6 is a enlarged partial side view of a flexible beam of one embodiment of a micro-actuator.

As shown in FIGS. 4–6, one embodiment of the present invention is described. FIG. 3 shows a skeleton 200 of a typical micro-actuator including flexible beams 210, a stator portion 220, a rotor portion 230, a head opening 240, and a motor opening 250. FIG. 4 shows an enlarged portion of FIG. 3 detailing flexible beam 210 and damping material 260.

Damping material 260 is a polymeric material. The damping material is deposited on skeleton 200 or may be deposited on flexible beams 210 only. Optionally, the damping material is cured to prevent out gassing.

Damping material 260 may be organic based or inorganic based. Organic based materials or coatings that can be spun on and easily sprayed on in a manner like any photo resist including polyacrylates, polycarbonates, polystyrenes, polyethelenes, polyimides, polyamides, and polyethers such as Velox. Organic materials can also be applied using vacuum techniques such as Chemical Vapor Deposition (CVD), Plasma Enhanced Chemical Vapor Deposition (PECVD) or an electron beam process using source materials of parylene, methane, ethane, and propane. These generate a variety of different Diamond Like Carbon (DLC) coatings with properties ranging from soft to hard and brittle to elastic.

Inorganic based materials include doped DLC such as DLC:Si, DLC:N, DLC:W, and DLC:Ti. Inorganic based materials include silicon based carbides, nitrides, oxides, oxycarbides, and oxynitrides. Inorganic based materials include metal based carbides, nitrides, oxides, oxycarbides, and oxynitrides such as TiC, WC, TiN, WN, WOC, WON, and TiO. Alternatively, the inorganic materials are applied using vacuum techniques such as CVD, PECVD, sputtering and electron beam processes.

FIG. 6 shows a further enlarged portion of flexible beam 210 with damping material 260. Optionally, flexible beams 210 are comprised of silicon. Damping material 260 is deposited on the entire flexible beams 210 or alternatively, deposited on the sides and the tops of the flexible beams 210.

Figure 7:
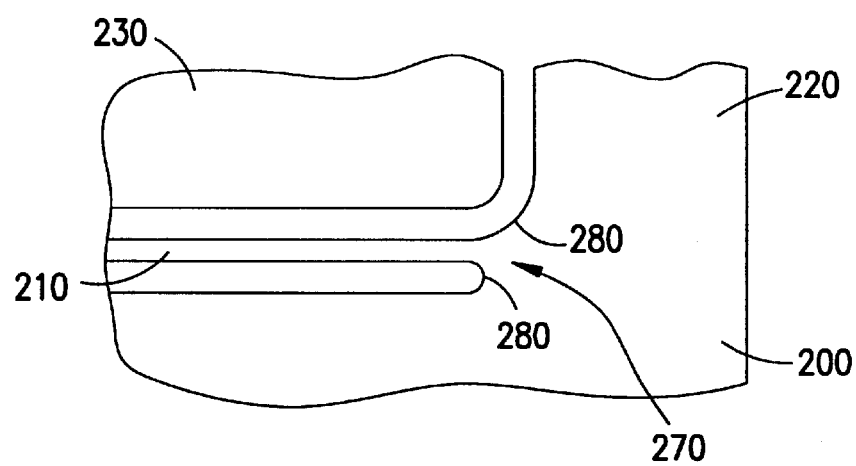
FIG. 7 is a enlarged partial top view of one embodiment of a skeleton showing a stress concentration area.
Figure 8:
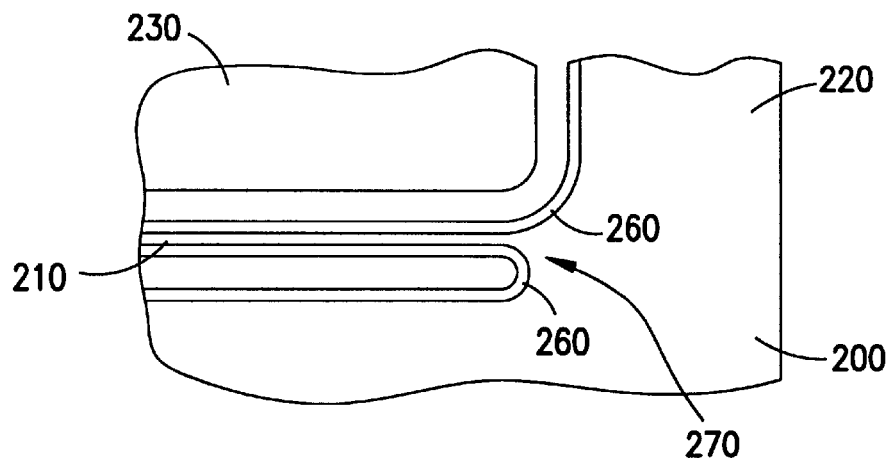
FIG. 8 is a enlarged partial top view of one embodiment of a skeleton showing a stress concentration area.

Referring to FIGS. 7–8, one embodiment of the present invention having reduced humidity infiltration is shown. FIG. 7 shows an enlarged portion of the skeleton 200 of the micro-actuator detailing a stress concentration area 270. FIG. 8 shows an enlarged portion of skeleton 200 of the micro-actuatot detailing stress concentration area 270 with damping material 260. In one embodiment, the stress concentration area 270 is located at the end of the flexible beams 210. Humid environments can cause crack initiations 280 in skeleton 210, particularly in stress concentration areas. Skeletons with a thin silicon structure of less than about 40$\mu$m thickness are most susceptible to crack initiations.

Figure 9:
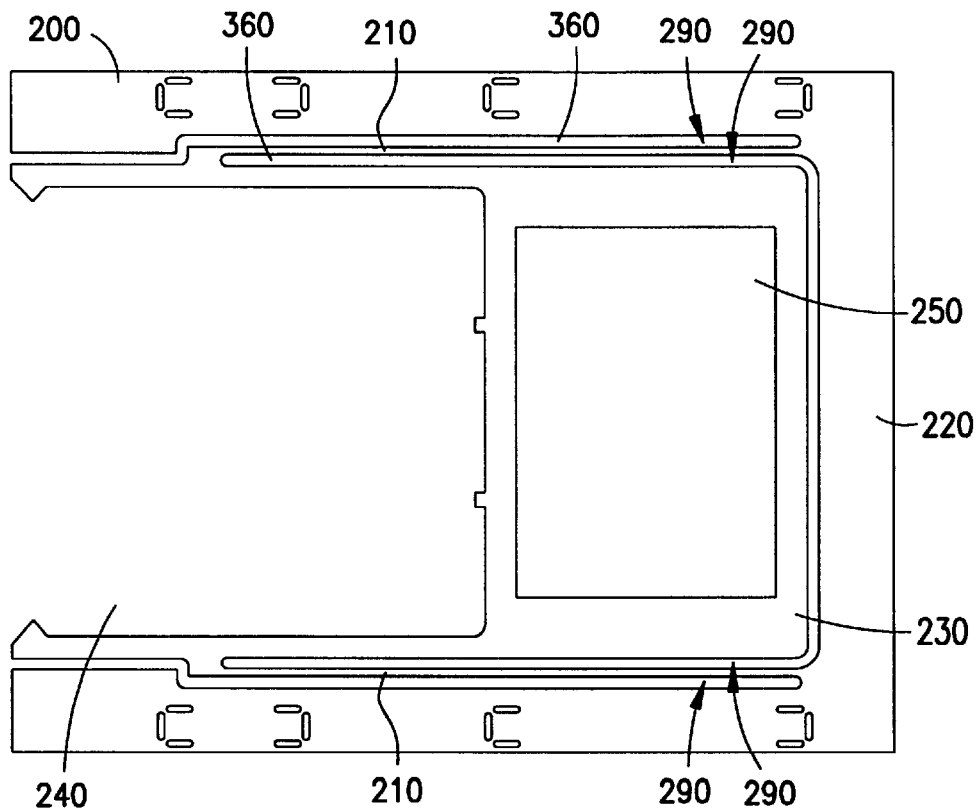
FIG. 9 is a top view of one embodiment of a skeleton of a micro actuator.

Referring to FIG. 9, a second embodiment of the present invention is shown. FIG. 9 shows the skeleton 200 of the micro-actuator with damping material 360. Damping material 360 is a liquid, preferably a lubricant, on flexible beams 210. Damping material 360 increases the damping performance of skeleton 210. Optionally, the damping material 360 may be inserted in the skeleton openings 290 between flexible beam 210 and the remainder of the skeleton 200. Optionally, The damping material 360 is added by a syringe to the skeleton and held in place by capillary action.

Figure 10:
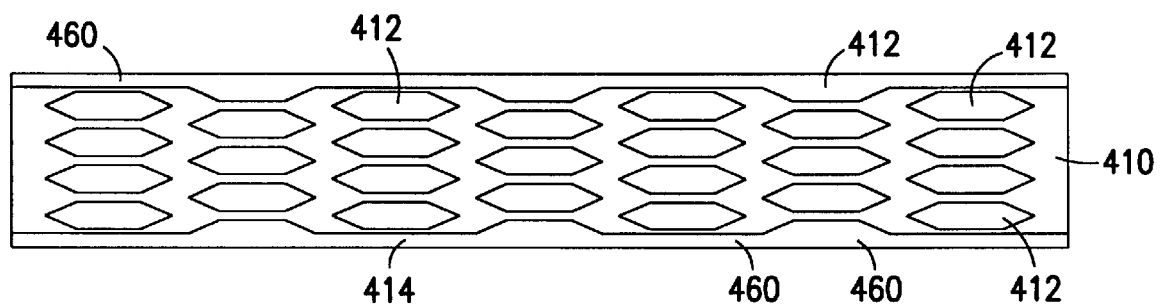
FIG. 10 is an enlarged partial side view of one embodiment of a flexible beam of a skeleton of a micro actuator.

Referring to FIG. 10, a third embodiment of the present invention is shown. FIG. 10 shows a detail of a flexible beam 410. In one embodiment, flexible beam 410 includes structural openings 412 creating a honeycomb structure 414. The structural openings 412 are filled with damping material 460. Optionally, damping material 460 coats the outside of the flexible beam 410. Damping material 460 includes any of those previously described. The honeycomb structure 414 enhances the frictional heating characteristics of the flexible beam 410 because more area of the microactuator is in contact with the energy disipating mazterials.

The present invention was analyzed using an Ansys model using COMBIN14 for damper elements. These are line elements with the force proportional to the rate of change in length: F=C*dL/dt where F=force in element, L=the element length, and C=damping coefficient.

There is a 0.7% environmental damping assumed in the "undamped" case. The actuation force was applied to obtain 1.8 $\mu$m stroke at DC. The rotor offtrack velocity reaches 0.63 m/s at the undamped primary resonance. To obtain a damping force on the order of the actuation force of 210 $\mu$N requires a damping coefficient of about 334 $\mu$N-s/m.

Figure 11:
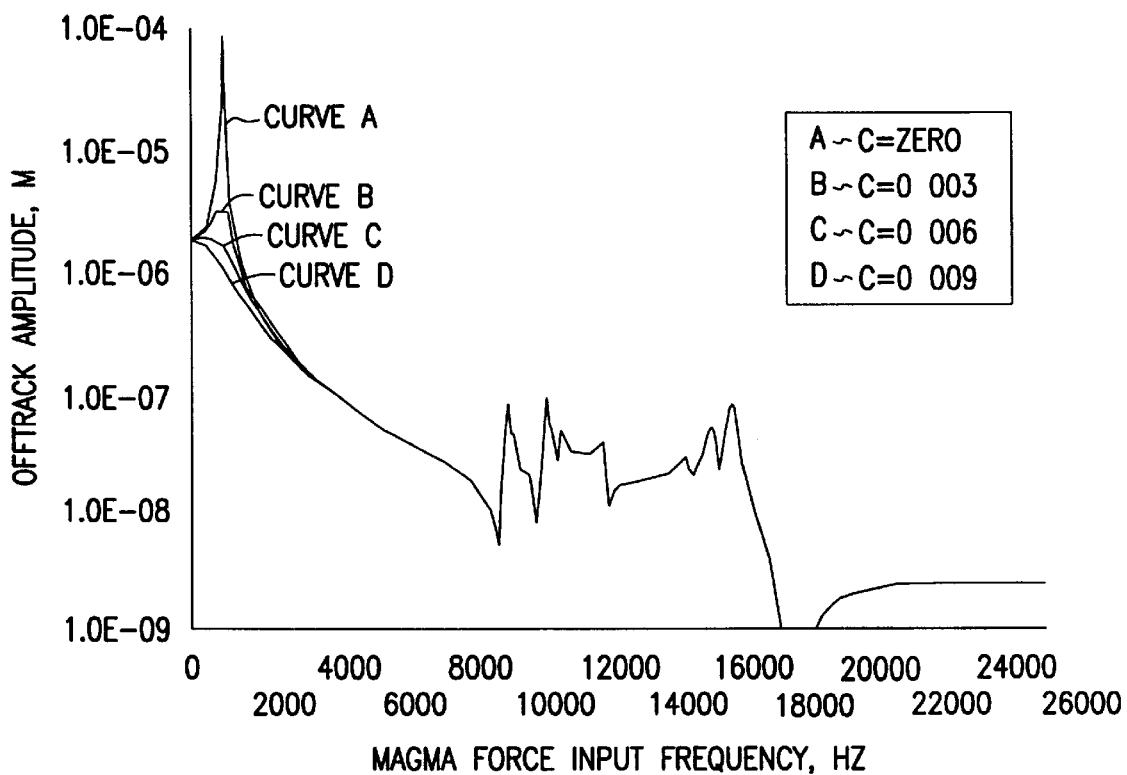
FIG. 11 is graph of amplitude versus frequency of one embodiment showing the effect of damping across the rotor/stator gap.

Referring to FIG. 11, the damping effect of damping across the rotor/stator gap is shown. Four dampers were applied between the rotor and the stator, between the bonding ears and the ends of the preload bars simulating a squeeze film such as the wicked disc lube concept. The damping was effective on the first mode only with only insignificant benefit to the higher modes. The damping coefficient to critically damp the primary mode was about 70000 $\mu$m-s/m. The modal velocity is reduced to 0.011 m/s at critical damping, so the damping force is 77 $\mu$N.

Figure 12:
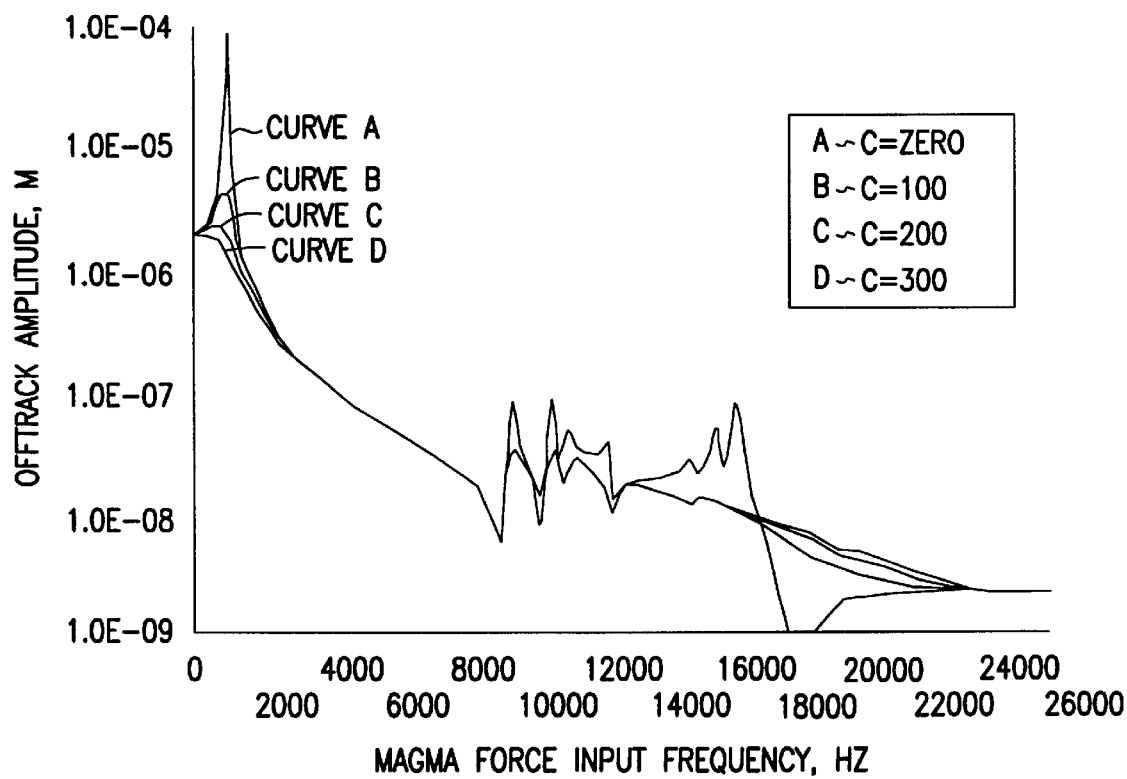
FIG. 12 is graph of amplitude versus frequency of one embodiment showing the effect of damping along the flexible beam edges.

Referring to FIG. 12, the damping effect of damping along the flexible beams is shown. Another damper application was to put 240 elements along the length of the flexible beam edges (eight lines were meshed). This simulated viscoelastic coating on the flexible beam surfaces. The damping coefficient to critically damp the primary mode was about 250 N-s/m. The velocity along the flexible beam edges is due to the slight curvature of the flexible beams, therefore it is much smaller than the rotor offtrack velocity. Therefore, the damping coefficient must be about 36000 times higher than the squeeze film simulation. Interestingly, while the squeeze film had no effect-on the secondary modes, the viscoelastic coating was effective to reduce the yaw mode gain from 12.8 dB to 4.0 dB as shown in Table 1 below.

TABLE 1

| GIMBAL YAWING MODE GAIN vs. DAMPING ALONG BEAM EDGES | |
|---|---|
| Damping, N-s/m | Gain, dB |
| 0 | 12.8 |
| 6.25 | 7.9 |
| 12.5 | 5.8 |
| 25 | 4.4 |
| 50 | 4.0 |
| 100 | 4.1 |
| 200 | 5.0 |
| 300 | 5.3 |

This model assumed constant viscosity with frequency. However, damping of viscoelastic polymers exhibits strong frequency dependance. The polymer usually loses effectiveness at high frequency due to lower viscosity from self-heating.

The damping material provides a protective layer to the flexible beams of a micro-actuator. The damping material increases the damping characteristics of the micro actuator and limits the penetration of humidity into the skeleton of the micro. actuator.

Figure 13:
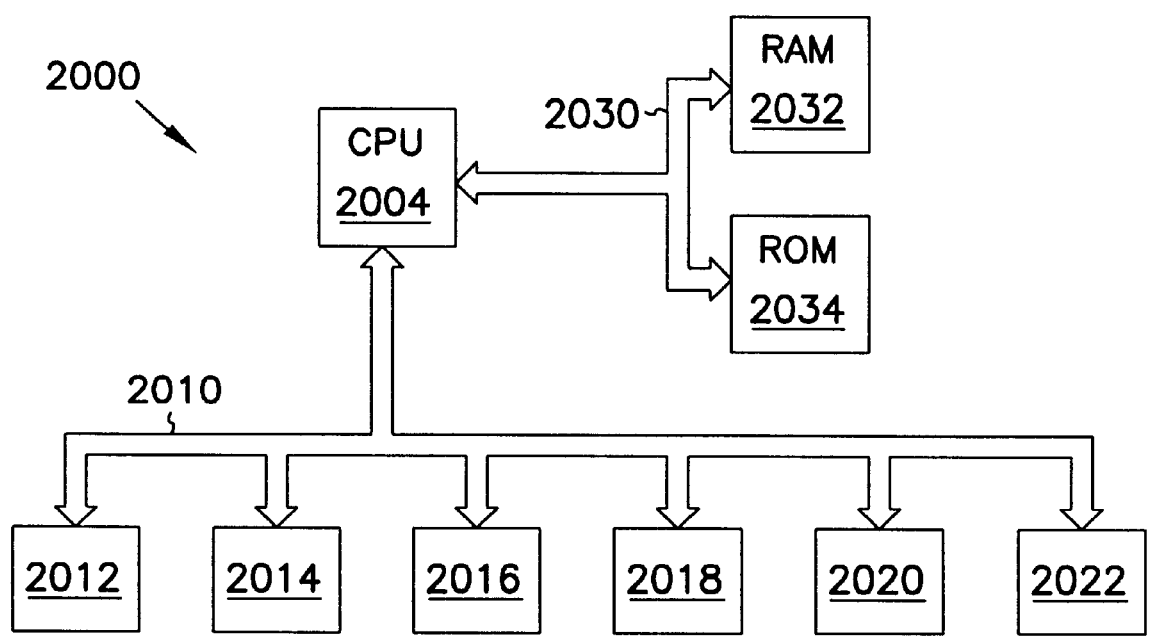
FIG. 13 is a schematic view of a computer system.

FIG. 13 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system-2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a micro-actuator including a skeleton 200 having flexible beams 210, a rotor portion 230, a stator portion 220, and a damping material 260 is disclosed. The flexible beams 210 connect the rotor portion 230 to the stator portion 220 and the damping material 260 is applied to the skeleton 200. The damping material 260 covers the flexible beams 210. Optionally, the damping material 260 covers the entire skeleton 200. Optionally, the damping material 260 is located at a stress concentration area 270. Optionally, the damping material 260 is located between the rotor portion 230 and the stator portion 220. Optionally, the damping material 260 is a lubricant, a polymeric material, an organic material, or an inorganic material. Optionally, the damping material 260 is selected from the group of polyacrylates, polycarbonates, polystyrenes, polyethelenes, polyimides, polyamides, and polyethers. Optionally, the damping material 260 has a source material selected from the group of parylene, methane, ethane, and propane. Optionally, the damping material 260 is a doped DLC. Optionally, the damping material 260 is selected from the group of DLC:Si, DLC:N, DLC:W, and DLC:Ti. Optionally, the damping material 260 is selected from the group of silicon based carbides, nitrides, oxides, oxycarbides, and oxynitrides. Optionally, the damping material 260 is selected from the group of metal based carbides, nitrides, oxides, oxycarbides, and oxynitrides. Optionally, the damping material 260 is selected from the group of TiC, WC, TiN, WN, WOC, WON, and TiO. Optionally, the damping material 260 is appliable by spinning and spraying on in a photoresist manner. Optionally, the damping material 260 is appliable using a method from the group of vacuum techniques, CVD, PECVD, sputtering and electron beam process. Optionally, the flexible beams 410 have structural openings 412. Optionally, the damping material 460 is in the structural openings 412.

Also disclosed is a disc drive 100 including a micro actuator having a skeleton 200 having flexible beams 210, a rotor portion 230, a stator portion 220, and a damping material 260. The flexible beams 210 connect the rotor portion 230 to the stator portion 220 and the damping material 260 is applied to the skeleton 200.

Also disclosed is an information system 2000 including a disc drive 100 having a micro-actuator having a skeleton 200 having flexible beams 210, a rotor portion 230, and a stator portion 220, and a damping material 260. The flexible beams 210 connect the rotor portion 230 to the stator portion 220 and the damping material 260 is applied to the skeleton 200.

Also disclosed is a method for damping a micro-actuator including applying a damping material 260 to a skeleton 200 having flexible beams 210.

Also disclosed is a micro-actuator including a skeleton 200 having flexible beams 210, a rotor portion 230 and a stator portion 220, and a damping means 260 for damping the mass spring frequency of the micro-actuator. The flexible beams 210 connect the rotor portion 230 to the stator portion 220.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A micro-actuator compirising:
   a skeleton having structural openings therein for forming flexible beams, the skeleton also having a rotor portion and a stator portion, the flexible beams connecting the rotor portion to the stator portion; and
   a damping material, the damping material positioned only on the skeleton.

2. The micro-actuator of claim 1 wherein the damping material covers the flexible beams.

3. The micro-actuator of claim 1 wherein the skeleton has a stress concentration area and the damping material is located at the stress concentration area.

4. The micro-actuator of claim 1 wherein the damping material is positioned on the rotor portion and the stator portion.

5. The micro-actuator of claim 1 wherein the damping material is a lubricant.

6. The micro-actuator of claim 1 wherein the damping material is a polymeric material.

7. The micro-actuator of claim 1 wherein the damping material is an organic material.

8. The micro-actuator of claim 1 wherein the damping material is selected from the group of polyacrylates, polycarbonates, polystyrenes, polyethelenes, polyimides, polyamides, and polyethers.

9. The micro-actuator of claim 1 wherein the damping material is slected from the group of DLC:Si, DLC:N, DLC:W, DLC:Ti.

10. The micro-actuator of claim 1 wherein the damping material is selected from the group of silicon based carbides, nitrides, oxides, oxycarbides, and oxynitrides.

11. The micro-actuator of claim 1 wherein the damping material is selected from the group of metal based carbides, nitrides, oxides, oxycarbides, and oxynitrides.

12. The micro-actuator of claim 1 wherein the damping material is selected from the group of TiC, WC, TiN, WN, WOC, WON, and TiO.

13. The micro-actuator of claim 1 wherein a dampening material is applied only to the skeleton to limit the penetration of humidity into the skeleton.

14. The micro-actuator of claim 1 wherein the means for damping the mass spring frequency of the skeleton includes applying a dampening material to the skeleton to limit the penetration of humidity into the skeleton.

15. The micro-actuator of claim 1 wherein the means for damping the mass spring frequency of the skeleton includes applying a dampening material to a portion of the flexible beams to limit the penetration of humidity into the flexible beams.

16. A disc drive comprising:
    a micro actuator having a skeleton having flexible beams, a rotor portion, and a stator portion, the flexible beams connecting the rotor portion to the stator portion; and
    a damping material, the damping material applied to only the flexible beam to limit the penetration of humidity into the flexible beam.

17. A method for damping a micro-actuator comprising the steps of:
    providing a skeleton having a rotor portion and a stator portion, wherein a flexible beam connects the rotor and stator portions;
    applying a dampening material only to the skeleton; and
    using the skeleton in the micro-actuator.

18. The method of claim 17 wherein the step of applying a damping material comprises spinning and spraying on like a photoresist material.

19. The method of claim 17 wherein the step of applying a damping material comprises using a method from the group of vacuum techniques, CVD, PECVD, sputtering and electron beam process.

20. The method of claim 17 wherein the step of applying a damping material comprises applying a damping material to the entire skeleton.

21. The method of claim 17 wherein the step of applying a damping material comprises applying a damping material on the rotor and stator portion.

22. A micro-actuator comprising:
    a skeleton having flexible beams, a rotor portion and a stator portion, the flexible beams connecting the rotor portion to the stator portion; and
    means for dampening the mass spring frequency of the skeleton.

23. The micro-actuator of claim 22 wherein the skeleton has openings therein which form the flexible beams, the rotor portion and the stator portion, wherein the means for damping the mass spring frequency of the micro-actuator include applying a damping material to portion of the flexible beams, rotor portion and stator portion that define the openings in the skeleton.

* * * * *